United States Patent
Chang et al.

(10) Patent No.: US 7,436,214 B2
(45) Date of Patent: Oct. 14, 2008

(54) PSEUDO DIFFERENTIAL CURRENT MODE RECEIVER

(75) Inventors: Il-Kwon Chang, Gimpo-si (KR); Yong-Weon Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 586 days.

(21) Appl. No.: 11/223,609

(22) Filed: Sep. 9, 2005

(65) Prior Publication Data

US 2006/0133539 A1 Jun. 22, 2006

(30) Foreign Application Priority Data

Dec. 16, 2004 (KR) .................. 10-2004-0106766

(51) Int. Cl.
*H03K 19/0175* (2006.01)
(52) U.S. Cl. .............. 326/82; 326/83; 326/22
(58) Field of Classification Search ............. 326/21, 326/26, 27, 82–90
See application file for complete search history.

(56) References Cited

U.S. PATENT DOCUMENTS

| 5,994,925 | A | 11/1999 | Sessions | 326/121 |
|---|---|---|---|---|
| 6,377,084 | B1 | 4/2002 | Forbes | 327/55 |
| 6,714,080 | B2 * | 3/2004 | Burns | 330/288 |
| 7,095,280 | B2 * | 8/2006 | Regier et al. | 330/258 |
| 7,154,307 | B2 * | 12/2006 | Pradhan et al. | 327/108 |
| 7,170,790 | B2 * | 1/2007 | Demange et al. | 365/185.21 |
| 7,177,616 | B2 * | 2/2007 | Connell et al. | 455/296 |
| 7,227,400 | B1 * | 6/2007 | Gillespie et al. | 327/333 |
| 2006/0044071 | A1 * | 3/2006 | Hairston | 330/311 |

OTHER PUBLICATIONS

Korean Patent Application No. 1992-10084 to Kanai et al., having Publication date of Jan. 16, 1993 (w/English Abstract page).
Korean Patent Application No. 10-1998-49952 to Ruth et al., having Publication date of Jul. 26, 1999 (w/English Abstract page).

* cited by examiner

*Primary Examiner*—Don P Le
(74) *Attorney, Agent, or Firm*—Monica H. Choi (57) ABSTRACT

A pseudo differential current mode receiver includes a regulated cascode buffer for buffering a received data current to generate a buffered data current with cascode-reduced input impedance and cascode-increased output impedance. In addition, a signal converter generates an output signal indicating a difference between the buffered data current and a reference current. The reference current may also be received and buffered by a regulated cascode buffer with cascode-reduced input impedance and cascode-increased output impedance.

27 Claims, 10 Drawing Sheets

PSEUDO DIFFERENTIAL CURRENT MODE RECEIVER

CROSS-REFERENCE TO RELATED APPLICATION(S)

The present application claims priority under 35 U.S.C. §119 to Korean Patent Application No. 2004-106766, filed on Dec. 16, 2004, which is incorporated herein by reference in its entirety.

TECHNICAL FIELD

The present invention relates generally to current mode transmission of data, and more particularly, to a pseudo differential current mode receiver with minimized effects from noise and with cascode-reduced input impedance and cascode-increased output impedance.

BACKGROUND OF THE INVENTION

A signal is commonly transferred through a transmission line which may be a printed circuit board trace or a metal line. Such a signal is generally transferred in one of a voltage mode or a current mode. For transmission of digital data in the voltage mode, a signal received with a voltage level in a range of from about 2.7 Volts to 3.3 Volts is interpreted as having a logic high state. Alternatively, a signal received with a voltage level in a range of from about 0 Volts to 0.6 Volts is interpreted as having a logic low state. However, resistive-capacitive delays during data transmission may result in signal distortion in the voltage mode, especially during high speed operation.

In contrast for the current mode, current levels are used instead for indicating logic state. A signal received with a current level in a range of from about 17 milli-Amps to 23 milli-Amps is interpreted as having a logic high state. Alternatively, a signal received with a current level in a range of from about 0 milli-Amps to 6 milli-Amps is interpreted as having a logic low state. Resistive-capacitive delay during signal transmission does not affect current level such that data transmission in the current mode is not as sensitive to the resistive-capacitive delay.

For data transmission in pseudo-differential current mode, a transmitter transfers a reference current and a data current. The receiver then determines the logic state by comparing the reference current and the data current. For enhanced operation, the noise in the reference current and the data current are desired to be equalized. Such equalized noise may be canceled in the difference between the reference current and the data current. In addition for improved operation, a pseudo-differential current mode receiver is desired to have low input impedance and high output impedance.

SUMMARY OF THE INVENTION

Accordingly, a pseudo differential current mode receiver of an aspect of the present invention includes a regulated cascode buffer for buffering a received data current. The regulated cascode buffer generates a buffered data current with cascode-reduced input impedance and cascode-increased output impedance. In addition, a signal converter generates an output signal indicating a difference between the buffered data current and a reference current.

In another embodiment of the present invention, the pseudo differential current mode receiver further includes another regulated cascode buffer for buffering the reference current to generate a buffered reference current with cascode-reduced input impedance and cascode-increased output impedance. The pseudo differential current mode receiver also includes a current mirror for mirroring the buffered reference current to generate a mirrored reference current. In that case, the signal converter is an I-V converter that converts a difference between the buffered data current and the mirrored reference current into an output voltage.

In a further embodiment of the present invention, the regulated cascode buffers have a same circuit topology and have matched MOSFETs, such that noise in the buffered data current and the mirrored reference current are equalized.

In one embodiment of the present invention, the received reference current and the received data current both flow out of the regulated cascode buffers. Alternatively, the received reference current and the received data current both flow into the regulated cascode buffers.

In another embodiment of the present invention, the pseudo differential current mode receiver includes a reference current generator that generates the reference current from a reference voltage. In an example embodiment of the present invention, the received data current flows out of the regulated cascode buffer, the buffered data current flows out of the signal converter, and the reference current flows into the signal converter. In an alternative embodiment of the present invention, the received data current flows into the regulated cascode buffer, the buffered data current flows into the signal converter, and the reference current flows out of the signal converter.

A pseudo differential current mode transceiver system according to another aspect of the present invention includes a regulated cascode buffer, a current mirror, a plurality of additional regulated cascode buffers, and a plurality of I-V converters. The regulated cascode buffer receives a reference current and generates a buffered reference current with cascode-reduced input impedance and cascode-increased output impedance. The current mirror generates a mirrored reference current by mirroring the buffered reference current. Each of the plurality of additional regulated cascode buffers generates a respective buffered data current with cascode-reduced input impedance and cascode-increased output impedance from a respective received data current. Each of the plurality of I-V converters generates a respective output voltage by converting a difference of a respective buffered data current and the mirrored reference current.

The pseudo differential current mode transceiver system also includes a data transmitter and a plurality of transmission lines. The data transmitter generates the reference current and the data currents received by the regulated cascode buffers. Each transmission line has a respective one of the reference current and the data currents transmitted thereon between the data transmitter and a respective one of the regulated cascode buffers.

Such a pseudo differential current mode transceiver system advantageously shares the reference current among the multiple I-V converters. In this manner, the pseudo differential current mode receiver uses regulated cascode buffers for providing low input impedance and high output impedance. In addition, by further equalizing noise in the buffered data current and the mirrored reference current, the undesired effects of such noise are minimized.

These and other features and advantages of the present invention will be better understood by considering the following detailed description of the invention which is presented with the attached drawings.

The figures referred to herein are drawn for clarity of illustration and are not necessarily drawn to scale. Elements having the same reference number in FIGS. 1, 2, 3, 4, 5, 6, 7, 8, 9, 10, and 11 refer to elements having similar structure and/or function.

DETAILED DESCRIPTION

Figure 1:
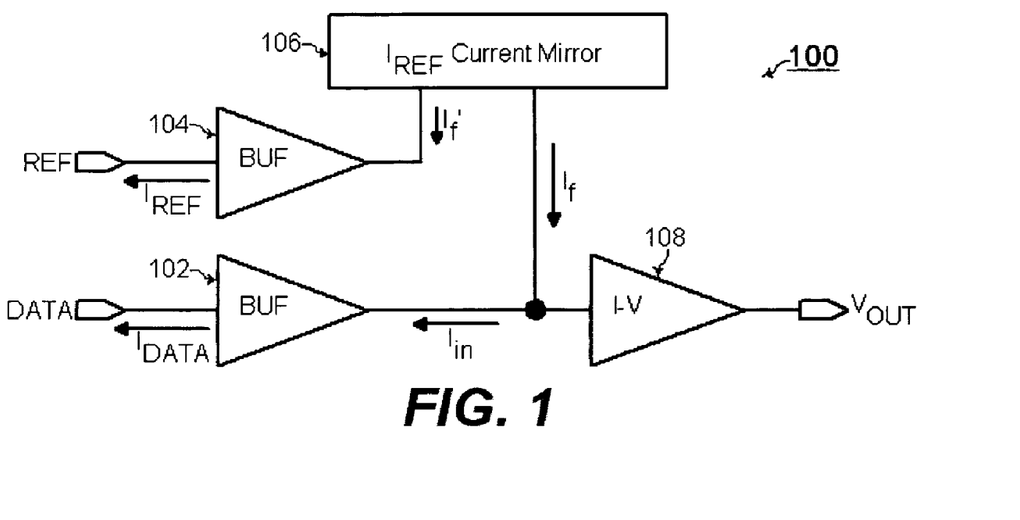
FIG. 1 shows a block diagram of a pseudo differential current mode receiver, according to an embodiment of the present invention.

FIG. 1 shows a block diagram of a pseudo differential current mode receiver 100 according to an embodiment of the present invention. The pseudo differential current mode receiver 100 includes a first regulated cascode buffer 102, a second regulated cascode buffer 104, a reference current mirror 106, and a current-to-voltage (I-V) converter 108.

Figure 2:
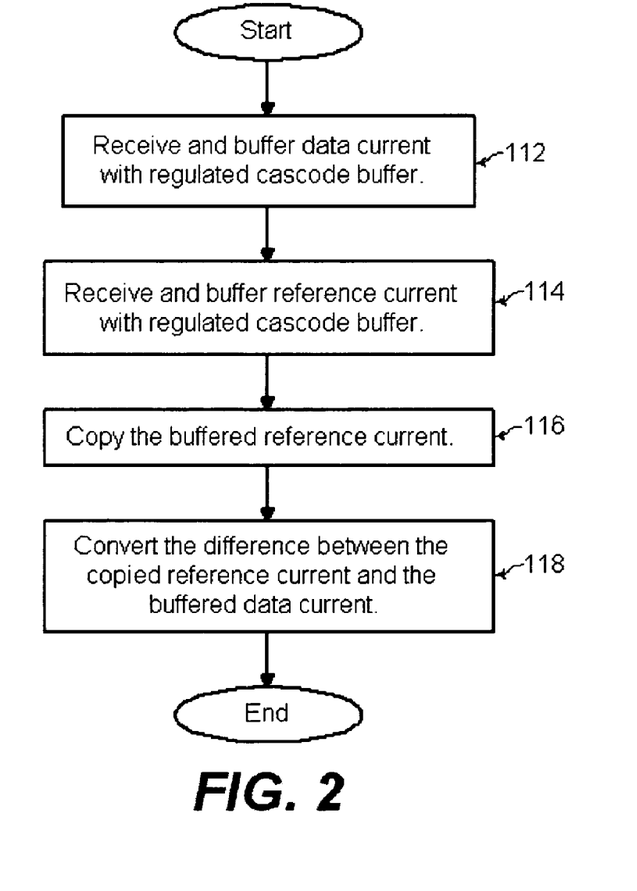
FIG. 2 shows a flow-chart of steps during operation of the pseudo differential current mode receiver of FIG. 1, according to an embodiment of the present invention.

FIG. 2 shows a flow-chart of steps during operation of the pseudo differential current mode receiver 100 of FIG. 1. Referring to FIGS. 1 and 2, the first regulated cascode buffer 102 receives and buffers a data current $I_{DATA}$ with low input impedance and high output impedance to generate a buffered data current $I_{in}$ (step 112 in FIG. 2). In addition, the second regulated cascode buffer 104 receives and buffers a reference current $I_{REF}$ with low input impedance and high output impedance to generate a buffered reference current $I_f'$ (step 114 in FIG. 2).

Furthermore, the reference current mirror 106 mirrors the buffered reference current $I_f'$ to generate a mirrored reference current $I_f$ (step 116 of FIG. 2). Subsequently, the I-V converter 108 converts a difference between the mirrored reference current $I_f$ and the buffered data current $I_{in}$ to generate an output voltage $V_{OUT}$ (step 118 in FIG. 2). For example, the output voltage $V_{OUT}$ indicates a logic state of the received data current $I_{DATA}$ depending on whether $I_{DATA}$ is greater than or less than the received reference current $I_{REF}$.

Figure 3:
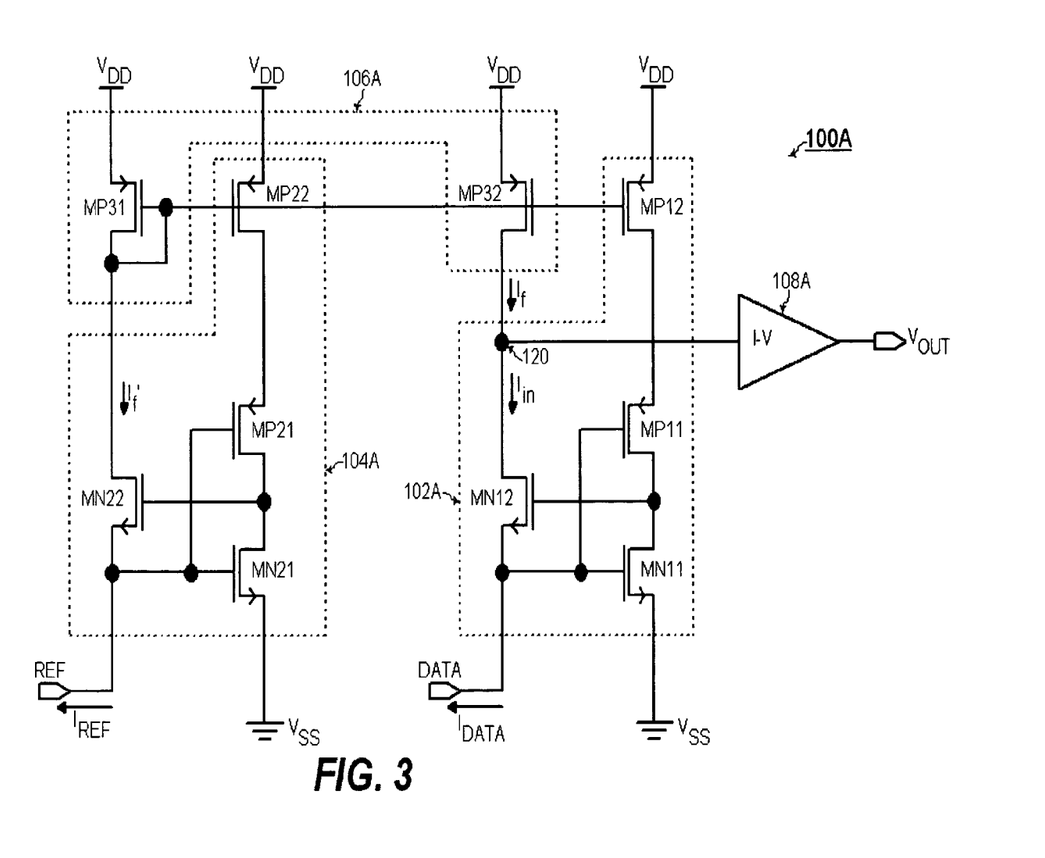
FIG. 3 shows a circuit diagram of the pseudo differential current mode receiver of FIG. 1, with regulated cascode buffers having a reference current and a data current flowing out there-from according to a first embodiment of the present invention.

FIG. 3 shows a circuit diagram of a pseudo differential current mode receiver 100A, according to a first embodiment of the present invention. The pseudo differential current mode receiver 100A of FIG. 3 operates similarly to the pseudo differential current mode receiver 100 of FIG. 1 and thus similarly includes a first regulated cascode buffer 102A, a second regulated cascode buffer 104A, a reference current mirror 106A, and an I-V converter 108A.

The first regulated cascode buffer 102A of FIG. 3 includes PMOSFETs (P-channel metal oxide semiconductor field effect transistors) MP11 and MP12 and includes NMOSFETs (N-channel metal oxide semiconductor field effect transistors) MN11 and MN12. The MOSFETs (metal oxide semiconductor field effect transistors) MN11, MN12, and MP11 are coupled in a regulated cascode configuration to form the regulated cascode buffer 102A while the PMOSFET MP12 provides a bias current within the regulated cascode buffer 102A.

In the regulated cascode configuration, the NMOSFET MN11 has a source coupled to a low supply voltage $V_{SS}$ (which is the ground node in the example of FIG. 3) and has a gate coupled to a DATA terminal receiving the data current $I_{DATA}$. The PMOSFET MP11 has a drain coupled to a drain of the NMOSFET MN11 and has a gate coupled to the DATA terminal. The NMOSFET MN12 has a source coupled to the DATA terminal and has a gate coupled to the drains of the MOSFETs MN11 and MP11.

The source of the PMOSFET MP11 receives the bias current from the PMOSFET MP12. The PMOSFET MP12 has a source coupled to a high supply voltage VDD and a drain coupled to the source of the PMOSFET MP11. The drain of the NMOSFET MN12 is coupled to an input node 120 of the I-V converter 108A.

With such a first regulated cascode buffer 102A of FIG. 3, the DATA terminal receives the data current $I_{DATA}$ that flows out from the first regulated cascode buffer 102A with low input impedance at the DATA terminal. Subsequently, the first regulated cascode buffer 102A generates the buffered data current $I_{in}$ which has a current level substantially equal to the received data current $I_{DATA}$. In addition, the buffered data current $I_{in}$ is generated through the drain of the NMOSFET MN12 with high output impedance thereon.

The second regulated cascode buffer 104A of FIG. 3 includes PMOSFETs MP21 and MP22 and NMOSFETs MN21 and MN22. Such MOSFETs MP21, MP22, MN21, and MN22 in the second regulated cascode buffer 104A are coupled together and operate similarly to the MOSFETs MP11, MP12, MN11, and MN12, respectively, in the first regulated cascode buffer 102A. Thus, the MOSFETs MN21, MN22, and MP21 are coupled in a regulated cascode configuration to form the second regulated cascode buffer 104A while the PMOSFET MP22 provides a bias current within the second regulated cascode buffer 104A.

With such a second regulated cascode buffer 104A of FIG. 3, a reference (REF) terminal receives the reference current $I_{REF}$ that flows out from the second regulated cascode buffer 104A with low input impedance at the REF terminal. Subsequently, the second regulated cascode buffer 104A generates a buffered reference current $I_f'$ which has a current level substantially equal to the received reference current $I_{REF}$. In addition, the buffered reference current $I_f'$ is generated through the drain of the NMOSFET MN22 with high output impedance thereon.

Further referring to FIG. 3, the pseudo differential current mode receiver 100A includes the current mirror 106A comprised of a diode-connected PMOSFET MP31 and a mirroring PMOSFET MP32. The diode-connected PMOSFET MP31 has a source coupled to the high supply voltage VDD and has a gate and a drain coupled together. The mirroring PMOSFET MP32 has a source coupled to the high supply voltage VDD and has a drain coupled to the input node 120 of the I-V converter 108A.

The buffered reference current $I_f'$ flowing through the diode-connected PMOSFET MP31 is mirrored to flow through the mirroring PMOSFET MP32 that provides a mirrored reference current $I_f$ to the input node 120 of the I-V converter 108A. Thus, the mirrored reference current $I_f$ has a current level that is substantially same as the received reference current $I_{REF}$ but flows into the input node 120 of the I-V converter 108A.

With the mirrored reference current $I_f$ flowing into and the buffered data current $I_{in}$ flowing out of the input node 120 of the I-V converter 108A, the I-V converter 108A readily generates the output voltage $V_{OUT}$ indicating a difference between such currents. Implementation for such an I-V converter 108A individually is known to one of ordinary skill in the art of electronics.

Additionally in FIG. 3, the gates of the PMOSFETs MP12 and MP22 are also coupled to the gate of the diode-connected PMOSFET MP31 for generating the bias currents through each of the PMOSFETs MP12 and MP22 for the regulated cascode buffers 102A and 104A, respectively. However, the present invention may be generalized to using any type of current sources for the PMOSFETs MP12 and MP22 as illustrated in FIG. 4.

Figure 4:
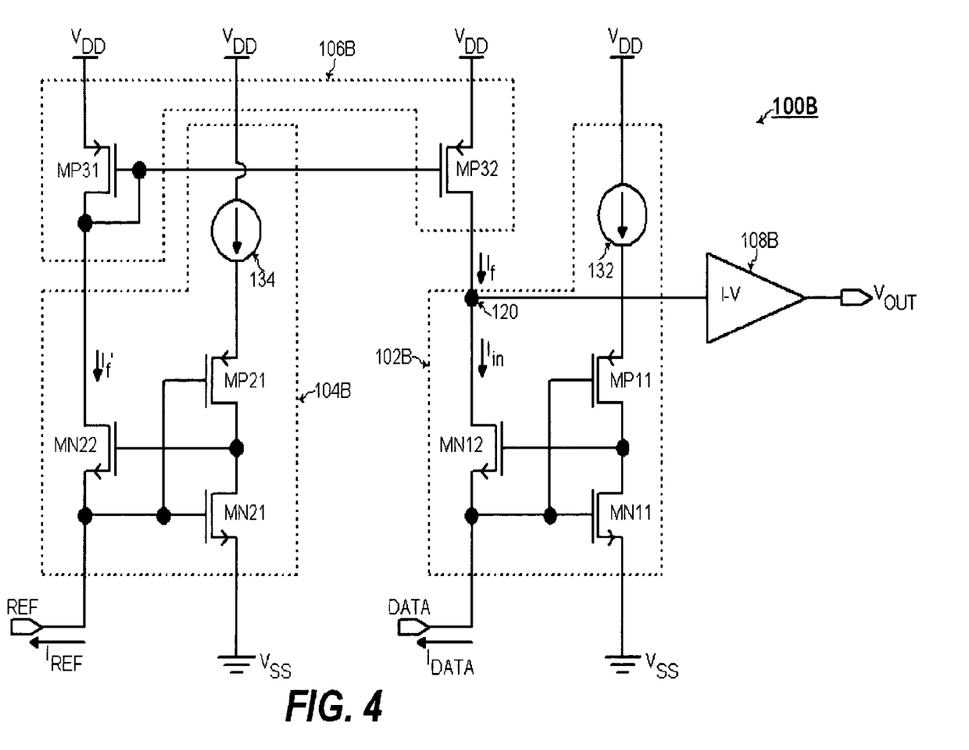
FIG. 4 shows a circuit diagram of the pseudo differential current mode receiver of FIG. 1, with regulated cascode buffers having a reference current and a data current flowing out there-from according to a second embodiment of the present invention.

FIG. 4 shows a circuit diagram of a pseudo differential current mode receiver 100B, according to a second embodiment of the present invention. The pseudo differential current mode receiver 100B includes a first regulated cascode buffer 102B, a second regulated cascode buffer 104B, a reference current mirror 106B, and an I-V converter 108B. The pseudo differential current mode receivers 100A of FIGS. 3 and 100B of FIG. 4 operate similarly.

However, the pseudo differential current mode receiver 100B of FIG. 4 has a first bias current source 132 for providing the bias current within the first regulated cascode buffer 102B, instead of the PMOSFET MP12 of FIG. 3. Additionally, the pseudo differential current mode receiver 100B of FIG. 4 has a second bias current source 134 for providing the bias current within the second regulated cascode buffer 104B, instead of the PMOSFET MP22 of FIG. 3.

Figure 5:
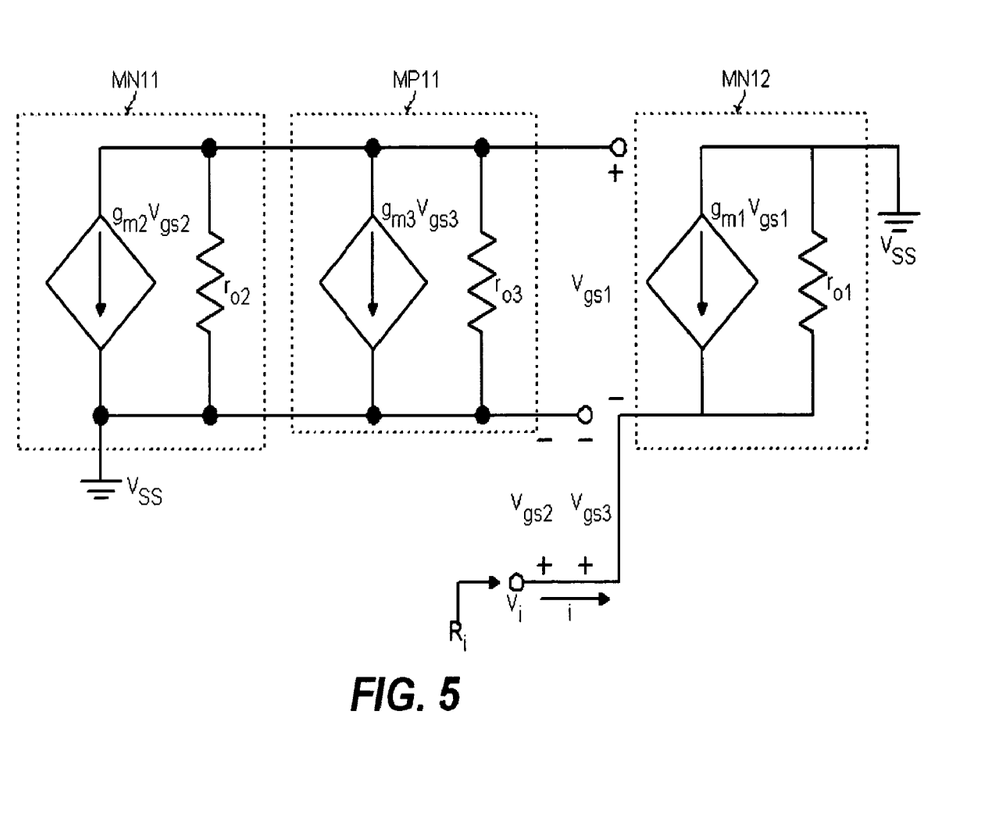
FIGS. 5 and 6 show small signal models of a regulated cascode buffer in FIG. 3 or 4 for determining input and output impedances, according to an embodiment of the present invention.
Figure 6:
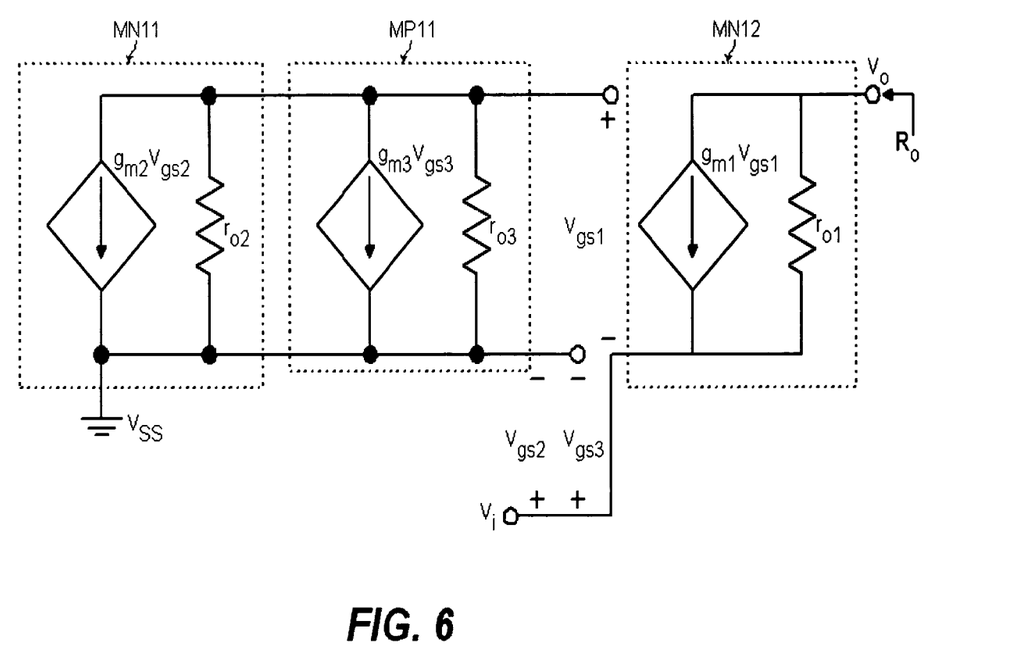

In any case of FIG. 3 or 4, the regulated cascode buffers 102A, 102B, 104A, and 104B provide low input impedance at the DATA terminal or the REF terminal and provide high output impedance at the input node 120 of the I-V converter 108A or 108B. FIGS. 5 and 6 show small signal models of an example one 102A of the regulated cascode buffers 102A, 102B, 104A, and 104B.

Referring to FIGS. 5 and 6, $g_{m1}$ denotes a transconductance, $V_{gs1}$ denotes a gate to source voltage, and $r_{o1}$ denotes a drain to source resistance, of the NMOSFET MN12. In addition, $g_{m2}$ denotes a transconductance, $V_{gs2}$ denotes a gate to source voltage, and $r_{o2}$ denotes a drain to source resistance, of the NMOSFET MN11. Furthermore, $g_{m3}$ denotes a transconductance, $V_{gs3}$ denotes a gate to source voltage, and $r_{o3}$ denotes a drain to source resistance, of the PMOSFET MP11.

Referring to FIG. 5, a Thevenin-equivalent input impedance $R_i$ (which is a ratio of an input voltage $v_i$ and an input current i) at the DATA terminal (or similarly the REF terminal) is derived as follows:

$$v_{gs2} = v_i = v_{gs3}$$

$$v_i = (i + g_{m1}v_{gs1})r_{o1}$$

$$v_{gs1} = -[1 + (g_{m2} + g_{m3})(r_{o2} // r_{o3})]v_i$$

$$v_i = r_{o1} \times i - g_{m1} \times r_{o1}[1 + (g_{m2} + g_{m3})(r_{o2} // r_{o3})]v_i$$

$$Ri = \frac{v_1}{i} = \frac{r_{o1}}{1 + g_{m1} \times r_{o1}[1 + (g_{m2} + g_{m3})(r_{o2} // r_{o3})]}$$

$$\approx \frac{1}{g_{m1}[1 + (g_{m2} + g_{m3})(r_{o2} // r_{o3})]}$$

Thus, the input impedance $R_i$ is cascode-reduced by the transconductances $g_{m2}$ and $g_{m3}$ of the MOSFETs MN11 and MP11, respectively. The input impedance at the DATA terminal or the REF terminal is similarly cascode-reduced for each of the regulated cascode buffers 102A, 102B, 104A, and 104B.

Referring to FIG. 6, a Thevenin-equivalent output impedance $R_o$ (which is a ratio of an output voltage $v_o$ and an input voltage $v_i$) at the drain of the NMOSFET MN12 (or similarly the NMOSFET 22) is derived as follows:

$$v_O = g_{m1}[1 + (g_{m2} + g_{m3})(r_{o2} // r_{o3})]v_i \times r_{o1} + v_i$$

$$\frac{v_O}{v_i} = 1 + g_{m1}r_{o1}[1 + (g_{m2} + g_{m3})(r_{o2} // r_{o3})]$$

$$R_O = \frac{1}{g_{m1}} + r_{o1}[1 + (g_{m2} + g_{m3})(r_{o2} // r_{o3})]$$

$$\approx r_{o1}[1 + (g_{m2} + g_{m3})(r_{o2} // r_{o3})]$$

Thus, the output impedance $R_o$ is cascode-increased by the transconductances $g_{m2}$ and $g_{m3}$ of the MOSFETs MN11 and MP11, respectively. The output impedance at the drain of the NMOSFET MN12 or the NMOSFET MN22 is similarly cascode-increased for each of the regulated cascode buffers 102A, 102B, 104A, and 104B.

In this manner, the pseudo differential current mode receiver 100A or 100B receives and processes the data current $I_{DATA}$ and the reference current $I_{REF}$ with low input impedance and high output impedance. In addition, the effect of noise in the pseudo differential current mode receiver 100A or 100B is minimized by using substantially same circuit topologies for the first and second regulated cascode buffers 102A and 104A in FIG. 3 or 102B and 104B in FIG. 4.

Furthermore, for minimizing the effect of such noise, the devices in such first and second regulated cascode buffers are matched as much as possible. Thus, the MOSFETs MN11, MN12, MP11, and MP12 in the first regulated cascode buffer 102A (or 102B) are matched to the MOSFETs MN21, MN22, MP21, and MP22, respectively, in the second regulated cascode buffer 104A (or 104B). Such matching may be for size dimensions or doping characteristics of the MOSFETs. In FIG. 4, the first current source 132 in the first regulated cascode buffer 102B is matched to the second current source 134 in the second regulated cascode buffer 104B.

With such matching between the first and second regulated cascode buffers 102A and 104A in FIG. 3 or 102B and 104B in FIG. 4, noise generated in the buffered data current $I_{in}$ and the mirrored reference current $I_f$ are equalized. When, the I-V converter 108A or 108B determines a difference between such currents $I_{in}$ and $I_f$, such equalized noise are canceled.

Figure 7:
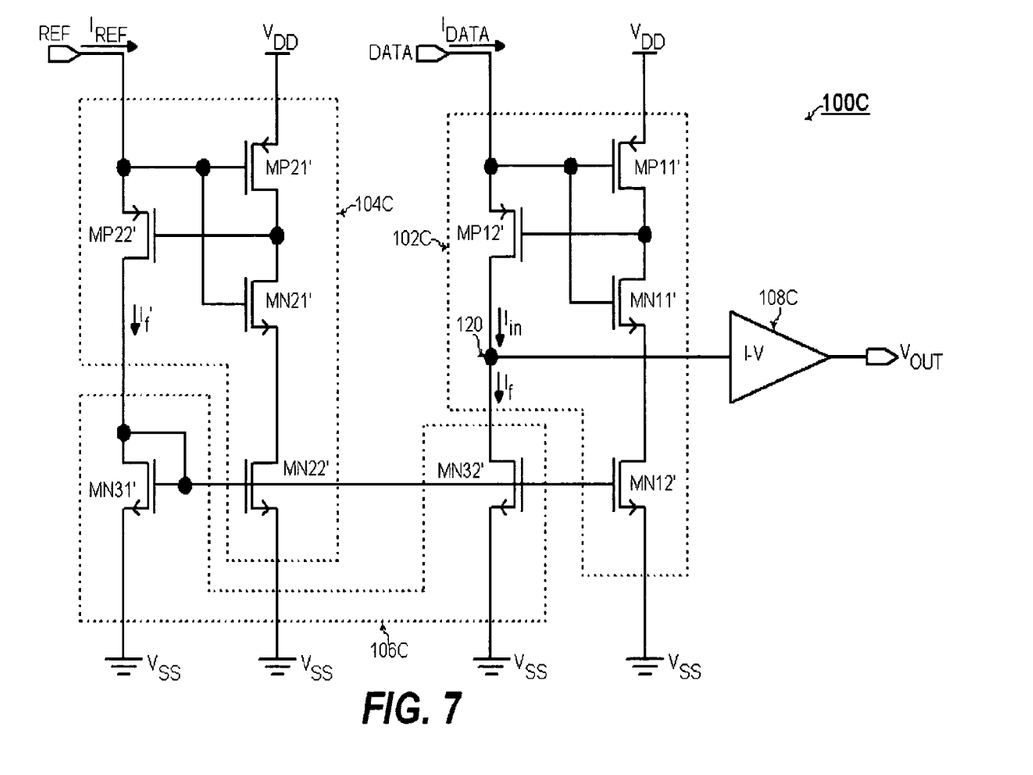
FIG. 7 shows a circuit diagram of the pseudo differential current mode receiver of FIG. 1, with regulated cascode buffers having a reference current and a data current flowing in there-to according to a third embodiment of the present invention.
Figure 8:
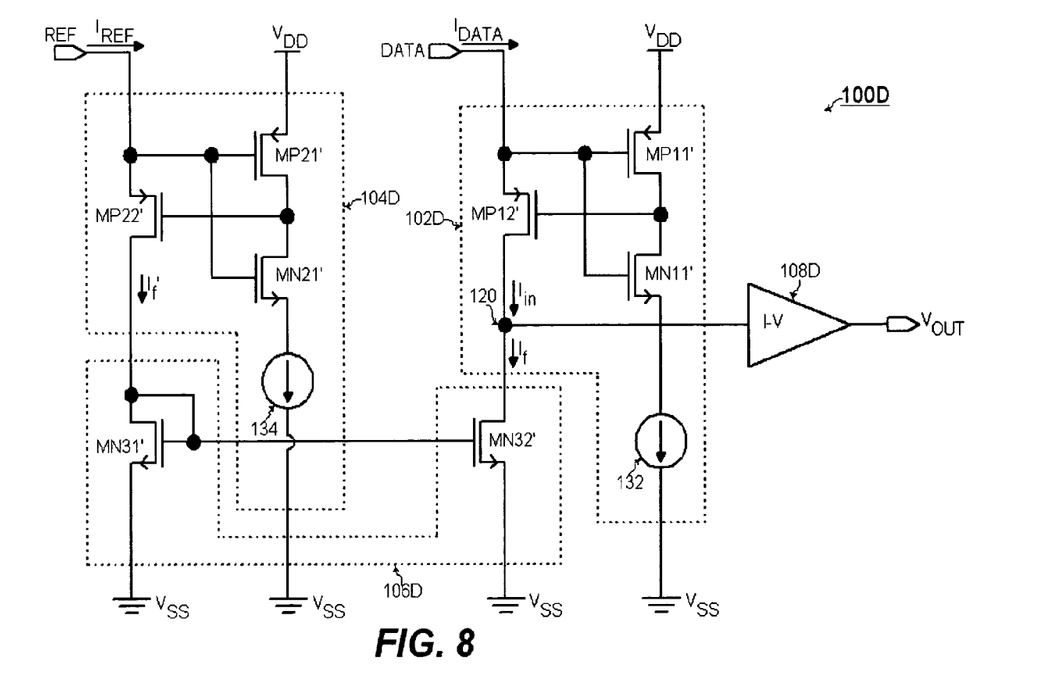
FIG. 8 shows a circuit diagram of the pseudo differential current mode receiver of FIG. 1, with regulated cascode buffers having a reference current and a data current flowing in there-to according to a fourth embodiment of the present invention.

FIGS. 3 and 4 show pseudo differential current mode receivers 100A and 100B, respectively, each with the data current $I_{DATA}$ and the reference current $I_{REF}$ flowing out from such receivers. FIGS. 7 and 8 show pseudo differential current mode receivers 100C and 100D, respectively, each with the data current $I_{DATA}$ and the reference current $I_{REF}$ flowing into such receivers.

FIG. 7 shows a circuit diagram of a pseudo differential current mode receiver 100C, according to a third embodiment of the present invention. The pseudo differential current mode receiver 100C includes a first regulated cascode buffer 102C, a second regulated cascode buffer 104C, a reference current mirror 106C, and an I-V converter 108C. The pseudo differential current mode receiver 100C of FIG. 7 accommodates the data current $I_{DATA}$ and the reference current $I_{REF}$ flowing into such a receiver 100C, but other-wise operates similarly to the pseudo differential current mode receiver 100A of FIG. 3.

Thus, comparing FIGS. 3 and 7, the direction of current flow and the conductivity of the MOSFETs are reversed. Thus, MOSFETs MP11', MP12', MN11', MN12', MN32', MP21', MP22', MN21', MN22', and MN31' in FIGS. 7 and 8 have reverse conductivity from the MOSFETs MN11, MN12, MP11, MP12, MP32, MN21, MN22, MP21, MP22, and MP31, respectively in FIGS. 3 and 4.

Similarly, FIG. 8 shows a circuit diagram of a pseudo differential current mode receiver 100D, according to a fourth embodiment of the present invention. The pseudo differential current mode receiver 100D includes a first regulated cascode buffer 102D, a second regulated cascode buffer 104D, a reference current mirror 106D, and an I-V converter 108D. The pseudo differential current mode receiver 100D of FIG. 8 accommodates the data current $I_{DATA}$ and the reference current $I_{REF}$ flowing into such a receiver 100D, but other-wise operates similarly to the pseudo differential current mode receiver 100B of FIG. 4. Thus, comparing FIGS. 4 and 8, the direction of current flow and the conductivity of the MOSFETs are reversed.

Figure 9:
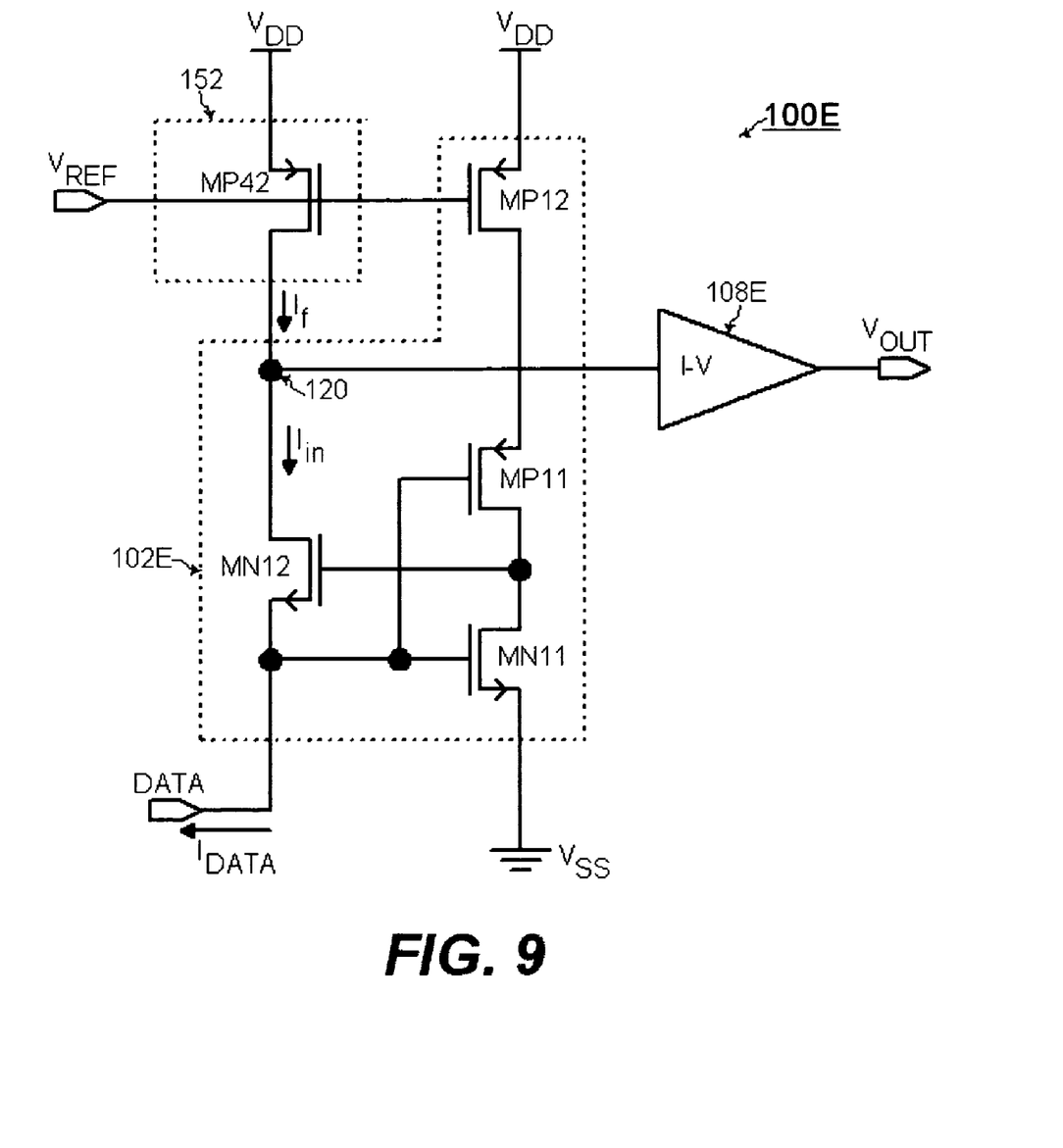
FIG. 9 shows a circuit diagram of a pseudo differential current mode receiver with generation of a reference current and with a data current flowing out of a regulated cascode buffer, according to a fifth embodiment of the present invention.

FIG. 9 shows a circuit diagram of a pseudo differential current mode receiver 100E, according to a fifth embodiment of the present invention. The pseudo differential current mode receiver 100E of FIG. 9 includes a regulated cascode buffer 102E and an I-V converter 108E that operate similarly to the first regulated cascode buffer 102A and the I-V converter 108A of FIG. 3. The pseudo differential current mode receiver 100E of FIG. 9 however includes a reference current generator 152 that generates the reference current $I_f$ flowing into the input node 120 of the I-V converter 108E within the pseudo differential current mode receiver 100E.

Referring to FIG. 9, the reference current generator 152 includes a PMOSFET MP42 having a source coupled to the high supply voltage $V_{DD}$ and a drain coupled to the input node 120 of the I-V converter 108E. The PMOSFET MP42 includes a gate having a reference voltage $V_{REF}$ applied thereon. The reference voltage $V_{REF}$ determines the level of the reference current $I_f$ flowing into the input node 120 of the I-V converter 108E. The reference voltage $V_{REF}$ may be generated on-chip or may be provided externally.

The I-V converter 108E generates the output voltage $V_{OUT}$ from a difference of the generated reference current $I_f$ from the reference current generator 152 and the buffered data current $I_{in}$. The pseudo differential current mode receiver 100E just receives the data current $I_{DATA}$ from a transmitter while the reference current $I_f$ is generated within the pseudo differential current mode receiver 100E. The data current $I_{DATA}$ flows out of the pseudo differential current mode receiver 100E in FIG. 9.

Figure 10:
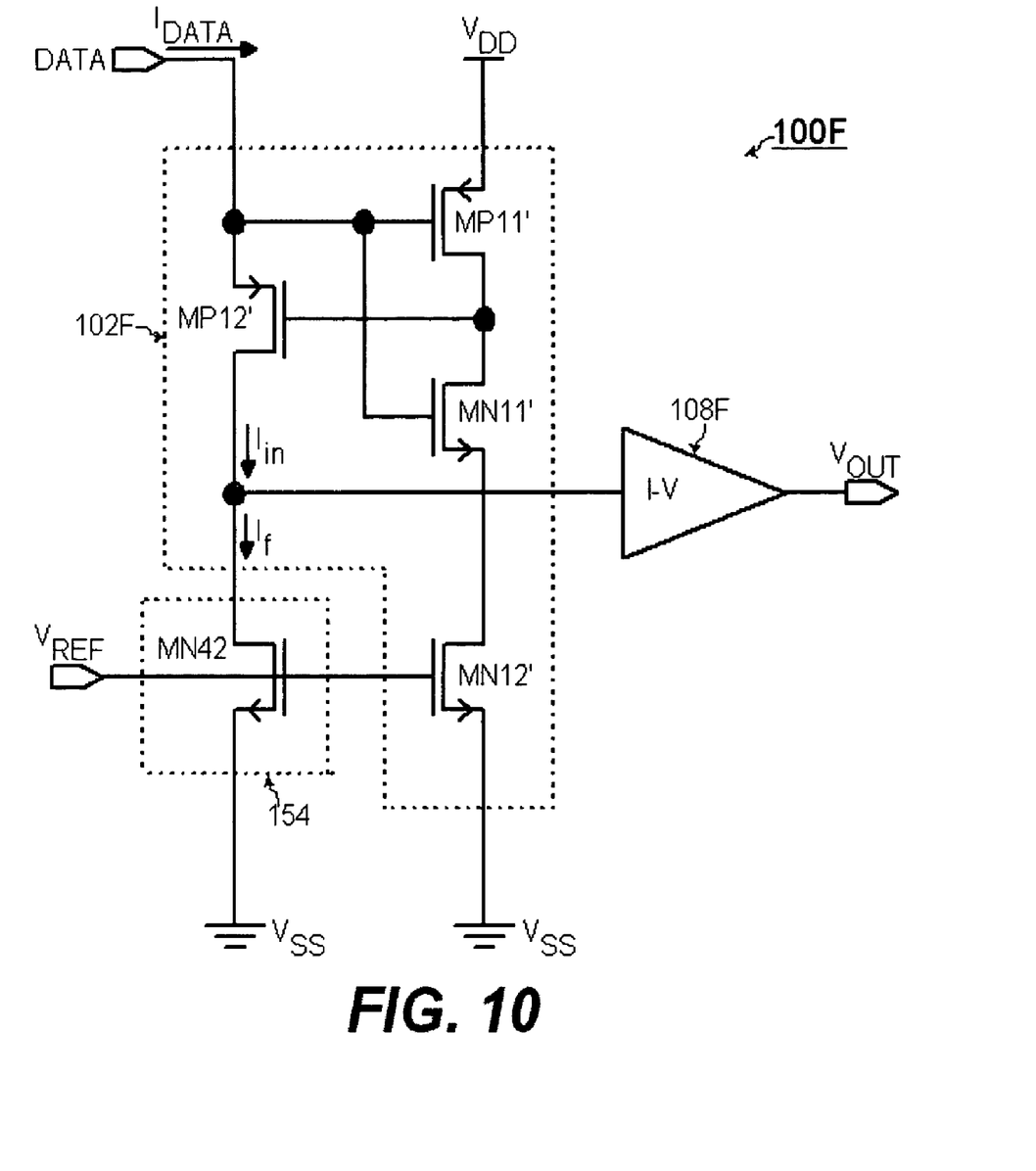
FIG. 10 shows a circuit diagram of a pseudo differential current mode receiver with generation of a reference current and with a data current flowing into a regulated cascode buffer, according to a sixth embodiment of the present invention.

FIG. 10 shows a circuit diagram of a pseudo differential current mode receiver 100F, according to a sixth embodiment of the present invention. The pseudo differential current mode receiver 100F of FIG. 10 includes a regulated cascode buffer 102F and an I-V converter 108F that operate similarly to the first regulated cascode buffer 102C and the I-V converter 108C of FIG. 7. The pseudo differential current mode receiver 100F of FIG. 10 however includes a reference current generator 154 that generates the reference current $I_f$ flowing out of the input node 120 of the I-V converter 108F within the pseudo differential current mode receiver 100F.

Referring to FIG. 10, the reference current generator 154 includes an NMOSFET MN42 having a source coupled to the low supply voltage $V_{SS}$ and a drain coupled to the input node 120 of the I-V converter 108F. The NMOSFET MN42 includes a gate having a reference voltage $V_{REF}$ applied thereon. The reference voltage $V_{REF}$ determines the level of the reference current $I_f$ flowing out of the input node 120 of the I-V converter 108F. The reference voltage $V_{REF}$ may be generated on-chip or may be provided externally.

The I-V converter 108F generates the output voltage $V_{OUT}$ from a difference of the generated reference current $I_f$ from the reference current generator 154 and the buffered data current $I_{in}$. The pseudo differential current mode receiver 100F just receives the data current $I_{DATA}$ from a transmitter while the reference current $I_f$ is generated within the pseudo differential current mode receiver 100F. The data current $I_{DATA}$ flows into the pseudo differential current mode receiver 100F in FIG. 10.

Furthermore, note that the present invention may be practiced with a general current source replacing the PMOSFET MP12 for providing a bias current within the regulated cascode buffer 102E. Similarly, the present invention may be practiced with a general current source replacing the NMOSFET MN12 for providing a bias current within the regulated cascode buffer 102F.

Figure 11:
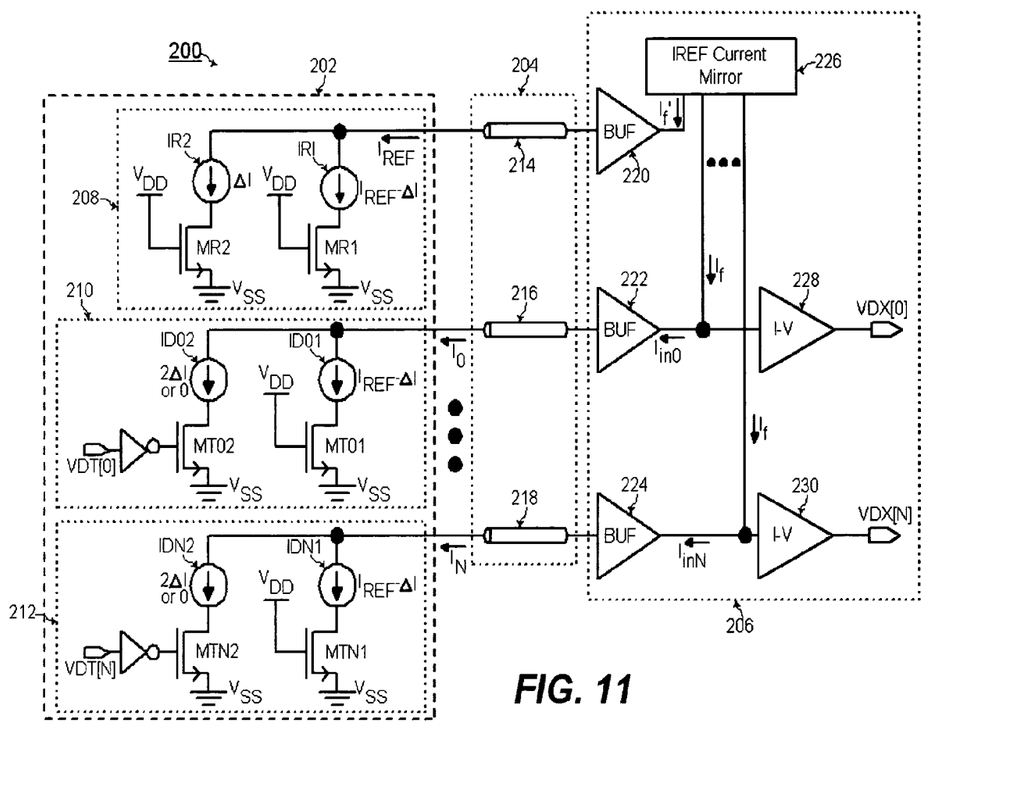
FIG. 11 shows a pseudo differential current mode transceiver system having a plurality of regulated cascode buffers, according to an embodiment of the present invention.

FIG. 11 shows a pseudo differential current mode transceiver system 200 according to an embodiment of the present invention. The pseudo differential current mode transceiver system 200 includes a data transmitter 202, transmission lines 204, and a data receiver 206. The data transmitter 202 includes a reference current transmitter 208 and a plurality of data current transmitters 210 and 212.

The reference current transmitter 208 includes a first NMOSFET MR1 having a source coupled to the low supply voltage $V_{SS}$ and a gate coupled to a high supply voltage $V_{DD}$. The first NMOSFET MR1 has a current level of $I_{REF}-\Delta I$ flowing there-through. The reference current transmitter 208 also includes a second NMOSFET MR2 having a source coupled to the low supply voltage $V_{SS}$ and a gate coupled to a high supply voltage $V_{DD}$. The second NMOSFET MR2 has a current level of $\Delta I$ flowing there-through.

Each of the data current transmitters 210 and 212 such as the Nth data current transmitter 212 for example includes a first NMOSFET MTN1 having a source coupled to the low supply voltage $V_{SS}$ and a gate coupled to a high supply voltage $V_{DD}$. The first NMOSFET MTN1 has a current level of $I_{REF}-\Delta I$ flowing there-through. The Nth data current transmitter 212 also includes a second NMOSFET MTN2 having a source coupled to the low supply voltage $V_{SS}$ and a gate coupled to a data voltage VDT[N].

The data voltage VDT[N] determines the current level flowing through the second NMOSFET MTN2. If the data voltage VDT[N] is at a logic high state, a current level of $2\Delta I$ flows through the second NMOSFET MTN2. If the data voltage VDT[N] is at a logic low state, the second NMOSFET MTN2 is turned off such that substantially zero current flows through the second NMOSFET MTN2.

Each of the current transmitters 208, 210, and 212 are coupled to a respective transmission line 214, 216, or 218. A current of $I_{REF}$ flows through the respective transmission line 214 coupled to the reference current transmitter 210. A current level of $I_{REF} \pm \Delta I$ flows through each of the transmission lines 216 and 218 coupled to a data current transmitter 210 or 212. If the data voltage VDT[N] within any data transmitter 212 is at a logic high state, a current level of $I_N = I_{REF} + \Delta I$ flows through the corresponding transmission line 218. If the data voltage VDT[N] within any data transmitter 212 is at a logic low state, a current level of $I_N = I_{REF} - \Delta I$ flows through the corresponding transmission line 218.

Each of the transmission lines 214, 216, and 218 is coupled to a respective regulated cascode buffer 220, 222, or 224. In the example embodiment of FIG. 11, the reference current and the data current transmitted through the transmission lines 214, 216, and 218 flow out from the receiver 206. The regulated cascode buffer 220 receiving the reference current IREF in FIG. 11 is implemented similarly as the regulated cascode buffer 104A of FIG. 3 or 104B of FIG. 4. Each of the regulated cascode buffers 222 and 224 receiving the data current $I_O$ or $I_N$ is similarly implemented as a regulated cascode buffer 102A of FIG. 3 or 102B of FIG. 4.

Alternatively, the pseudo differential current mode transceiver system 200 may be implemented with the reference current IREF and the data currents I0 and IN flowing into the receiver 206. In that case, the regulated cascode buffer 220 receiving the reference current IREF would be implemented similarly as the regulated cascode buffer 104C of FIG. 7 or 104D of FIG. 8. Also in that case, each of the regulated cascode buffers 222 and 224 receiving the data current $I_O$ or $I_N$ would be implemented similarly as a regulated cascode buffer 102C of FIG. 7 or 102D of FIG. 8.

The receiver 206 also includes a reference current mirror 226 that receives the buffered reference current $I_f'$ from the regulated cascode buffer 220. The reference current mirror 226 mirrors the buffered reference current $I_f'$ to generate a mirrored reference current $I_f$. The receiver 206 further includes current to voltage (I-V) converters 228 and 230, each coupled to the reference current mirror 226 and a respective one of the regulated cascode buffers 222 and 224 receiving a data current.

Each I-V converter such as the Nth I-V converter 230 for example receives a buffered data current $I_{inN}$ generated by a corresponding regulated cascode buffer 224 and the mirrored reference current $I_f$. The I-V converter 230 then generates an corresponding output voltage VDX[N] indicating a difference between such currents $I_{inN}$ and $I_f$ (i.e., $\pm \Delta I$). In this manner, the output voltage VDX[N] indicates the logic state of the data voltage VDT[N] used for generating the data current $I_N$ from the corresponding data current transmitter 212.

In this manner, the pseudo differential current mode transceiver system 200 uses the regulated cascode buffers 220, 222, and 224 in the receiver 206 to provide low input impedance and high output impedance. In addition, the reference current mirror 226 is efficiently shared by the regulated cascode buffers 222 and 224 such that one reference current is transmitted from the transmitter 202. Furthermore, for reducing effect of noise, the regulated cascode buffers 220, 222, and 224 are implemented with substantially same circuit topologies.

The pseudo differential current mode transceiver system 200 may be part of a display system such as a LCD (liquid crystal display) system with the transmitter 202 being a timing controller and the receiver 206 being a source driver of the LCD system. Alternatively, the pseudo differential current mode transceiver system 200 may be part of a high serial data interface. However, the pseudo differential current mode transceiver system 200 may also be used for any other data transmission applications.

The foregoing is by way of example only and is not intended to be limiting. For example, any number of elements shown and described herein is by way of example only. In addition, the present invention may be practiced with other types of devices having similar function than just the example devices shown and described herein. The present invention is limited only as defined in the following claims and equivalents thereof.

The invention claimed is:

1. A pseudo differential current mode receiver, comprising:
   a regulated cascode buffer for buffering a received data current to generate a buffered data current with cascode-reduced input impedance and cascode-increased output impedance; and
   a signal converter for generating an output signal indicating a difference between the buffered data current and a reference current.

2. The pseudo differential current mode receiver of claim 1, further comprising:
   another regulated cascode buffer for buffering the reference current to generate a buffered reference current with cascode-reduced input impedance and cascode-increased output impedance; and
   a current mirror for mirroring the buffered reference current to generate a mirrored reference current,
   wherein the signal converter is an I-V converter that converts a difference between the buffered data current and the mirrored reference current into an output voltage.

3. The pseudo differential current mode receiver of claim 2, wherein the regulated cascode buffers have a same circuit topology.

4. The pseudo differential current mode receiver of claim 3, wherein the regulated cascode buffers have matched MOSFETs (metal-oxide semiconductor field effect transistors).

5. The pseudo differential current mode receiver of claim 2, wherein the received reference current and the received data current flow out of the regulated cascode buffers.

6. The pseudo differential current mode receiver of claim 5, wherein each regulated cascode buffer is comprised of:
   a first NMOSFET (N-channel metal oxide semiconductor field effect transistor) having a source coupled to the received data current and a drain coupled to the current mirror and the I-V converter;
   a second NMOSFET having a gate coupled to the source of the first NMOSFET, a source coupled to a low power voltage, and a drain coupled to a gate of the first NMOSFET;
   a first PMOSFET (P-channel metal oxide semiconductor field effect transistor) having a drain coupled to a gate of the first NMOSFET and a drain of the second NMOSFET, and having a gate coupled to the source of the first NMOSFET and the gate of the second NMOSFET; and
   a current source coupled to a source of the first PMOSFET.

7. The pseudo differential current mode receiver of claim 6, wherein the current source is comprised of a second PMOSFET having a source coupled to a high power voltage, a gate coupled to the current mirror for biasing, and a drain coupled to the source of the first PMOSFET.

8. The pseudo differential current mode receiver of claim 2, wherein the received reference current and the received data current flow into the regulated cascode buffers.

9. The pseudo differential current mode receiver of claim 8, wherein each regulated cascode buffer is comprised of:
   a first PMOSFET (P-channel metal oxide semiconductor field effect transistor) having a source coupled to the received data current and a drain coupled to the current mirror and the I-V converter;
   a second PMOSFET having a gate coupled to the source of the first PMOSFET, a source coupled to a high power voltage, and a drain coupled to a gate of the first PMOSFET;
   a first NMOSFET (N-channel metal oxide semiconductor field effect transistor) having a drain coupled to a gate of the first PMOSFET and a drain of the second PMOSFET, and having a gate coupled to the source of the first PMOSFET and the gate of the second PMOSFET; and
   a current source coupled to a source of the first NMOSFET.

10. The pseudo differential current mode receiver of claim 9, wherein the current source is comprised of a second NMOSFET having a source coupled to a low power voltage, a gate coupled to the current mirror for biasing, and a drain coupled to the source of the first NMOSFET.

11. The pseudo differential current mode receiver of claim 1, further comprising:
   a reference current generator that generates the reference current from a reference voltage.

12. The pseudo differential current mode receiver of claim 11, wherein the received data current flows out of the regulated cascode buffer, and wherein the buffered data current flows out of the signal converter, and wherein the reference current flows into the signal converter, and wherein the signal converter is an I-V converter for converting a difference between the buffered data current and the reference current into an output voltage.

13. The pseudo differential current mode receiver of claim 12, wherein the regulated cascode buffer is comprised of:
   a first NMOSFET (N-channel metal oxide semiconductor field effect transistor) having a source coupled to the received data current and a drain coupled to the reference current generator and the I-V converter;
   a second NMOSFET having a gate coupled to the source of the first NMOSFET, a source coupled to a low power voltage, and a drain coupled to a gate of the first NMOSFET;
   a first PMOSFET (P-channel metal oxide semiconductor field effect transistor) having a drain coupled to a gate of the first NMOSFET and a drain of the second NMOSFET, and having a gate coupled to the source of the first NMOSFET and the gate of the second NMOSFET; and
   a current source coupled to a source of the first PMOSFET.

14. The pseudo differential current mode receiver of claim 13, wherein the current source is comprised of a second PMOSFET having a source coupled to a high power voltage, a gate coupled to the reference current generator for biasing, and a drain coupled to the source of the first PMOSFET.

15. The pseudo differential current mode receiver of claim 11, wherein the received data current flows into the regulated cascode buffer, and wherein the buffered data current flows into the signal converter, and wherein the reference current flows out of the signal converter, and wherein the signal converter is an I-V converter for converting a difference between the buffered data current and the reference current into an output voltage.

16. The pseudo differential current mode receiver of claim 15, wherein the regulated cascode buffer is comprised of:
   a first PMOSFET (P-channel metal oxide semiconductor field effect transistor) having a source coupled to the received data current and a drain coupled to the reference current generator and the I-V converter;
   a second PMOSFET having a gate coupled to the source of the first PMOSFET, a source coupled to a high power voltage, and a drain coupled to a gate of the first PMOSFET;
   a first NMOSFET (N-channel metal oxide semiconductor field effect transistor) having a drain coupled to a gate of the first PMOSFET and a drain of the second PMOSFET, and having a gate coupled to the source of the first PMOSFET and the gate of the second PMOSFET; and
   a current source coupled to a source of the first NMOSFET.

17. The pseudo differential current mode receiver of claim 16, wherein the current source is comprised of a second NMOSFET having a source coupled to a low power voltage, a gate coupled to the reference voltage generator for biasing, and a drain coupled to the source of the first NMOSFET.

18. A pseudo differential current mode transceiver system, comprising:
   a regulated cascode buffer for buffering a received reference current to generate a buffered reference current with cascode-reduced input impedance and cascode-increased output impedance;
   a current mirror that mirrors the buffered reference current to generate a mirrored reference current;
   a plurality of additional regulated cascode buffers, each buffering a respective received data current to generate a respective buffered data current with cascode-reduced input impedance and cascode-increased output impedance; and
   a plurality of I-V converters, each converting a difference of a respective buffered data current and the mirrored reference current into a respective output voltage.

19. The pseudo differential current mode transceiver system of claim 18, further comprising:
   a data transmitter for generating the reference current and the data currents received by the regulated cascode buffers; and
   a plurality of transmission lines, each having a respective one of the reference current and the data currents transmitted thereon between the data transmitter and a respective one of the regulated cascode buffers.

20. The pseudo differential current mode transceiver system of claim 18, wherein the regulated cascode buffers have a same circuit topology.

21. The pseudo differential current mode transceiver system of claim 18, wherein each of the received reference current and the received data currents flow out of the regulated cascode buffers.

22. The pseudo differential current mode transceiver system of claim 20, wherein each regulated cascode buffer is comprised of:
   a first NMOSFET (N-channel metal oxide semiconductor field effect transistor) having a source coupled to one received data current or the received reference current and a drain coupled to the current mirror and the I-V converter;

a second NMOSFET having a gate coupled to the source of the first NMOSFET, a source coupled to a low power voltage, and a drain coupled to a gate of the first NMOSFET;

a first PMOSFET (P-channel metal oxide semiconductor field effect transistor) having a drain coupled to a gate of the first NMOSFET and a drain of the second NMOSFET, and having a gate coupled to the source of the first NMOSFET and the gate of the second NMOSFET; and a current source coupled to a source of the first PMOSFET.

23. The pseudo differential current mode transceiver system of claim 18, wherein each of the received reference current and the received data currents flow into the regulated cascode buffers.

24. The pseudo differential current mode transceiver system of claim 23, wherein each regulated cascode buffer is comprised of:

a first PMOSFET (P-channel metal oxide semiconductor field effect transistor) having a source coupled to one received data current or the received reference current, and a drain coupled to the current mirror and the I-V converter;

a second PMOSFET having a gate coupled to the source of the first PMOSFET, a source coupled to a high power voltage, and a drain coupled to a gate of the first PMOSFET;

a first NMOSFET (N-channel metal oxide semiconductor field effect transistor) having a drain coupled to a gate of the first PMOSFET and a drain of the second PMOSFET, and having a gate coupled to the source of the first PMOSFET and the gate of the second PMOSFET; and a current source coupled to a source of the first NMOSFET.

25. A method of processing a data current, comprising:

buffering a received data current to generate a buffered data current with cascode-reduced input impedance and cascode-increased output impedance; and generating an output signal indicating a difference between the buffered data current and a reference current.

26. The method of claim 25, further comprising:

buffering a received reference current to generate a buffered reference current with cascode-reduced input impedance and cascode-increased output impedance;

mirroring the buffered reference current to generate a mirrored reference current; and converting a difference between the buffered data current and the mirrored reference current into an output voltage.

27. The method of claim 25, further comprising:

generating the reference current from a reference voltage.

* * * * *